(12) United States Patent
Sataka et al.

(10) Patent No.: US 10,126,113 B2
(45) Date of Patent: Nov. 13, 2018

(54) SPECTROSCOPE AND MICROSPECTROSCOPIC SYSTEM

(71) Applicant: NIKON CORPORATION, Tokyo (JP)

(72) Inventors: Ryoichi Sataka, Yokohama (JP); Hisao Osawa, Kashiwa (JP)

(73) Assignee: NIKON CORPORATION, Tokyo (JP)

( * ) Notice: Subject to any disclaimer, the term of this patent is extended or adjusted under 35 U.S.C. 154(b) by 0 days.

(21) Appl. No.: 14/751,771

(22) Filed: Jun. 26, 2015

(65) Prior Publication Data

US 2015/0292862 A1    Oct. 15, 2015

Related U.S. Application Data

(63) Continuation of application No. PCT/JP2013/083726, filed on Dec. 17, 2013.

(30) Foreign Application Priority Data

Dec. 28, 2012  (JP) ................. 2012-288637

(51) Int. Cl.
| | | |
|---|---|---|
| G01J 3/28 | (2006.01) | |
| G01B 9/04 | (2006.01) | |
| G01J 3/36 | (2006.01) | |
| G02B 21/00 | (2006.01) | |
| G01J 3/02 | (2006.01) | |
| G01J 3/44 | (2006.01) | |

(52) U.S. Cl.
CPC ............... *G01B 9/04* (2013.01); *G01J 3/021* (2013.01); *G01J 3/0208* (2013.01); *G01J 3/0216* (2013.01); *G01J 3/2803* (2013.01); *G01J 3/36* (2013.01); *G01J 3/4406* (2013.01); *G02B 21/0064* (2013.01)

(58) Field of Classification Search
CPC ........ G01J 3/02; G01J 1/04; G01J 3/28; G01J 3/0208; G01J 3/021; G01J 3/2803; G01J 3/36; G01J 3/4406; G01D 5/24404; H04N 13/0257; H04N 13/02; G02B 26/02;
(Continued)

(56) References Cited

U.S. PATENT DOCUMENTS

| | | | |
|---|---|---|---|
| 6,396,053 B1 * | 5/2002 | Yokoi | G01D 5/24404 250/231.13 |
| 7,256,890 B2 | 8/2007 | Osawa et al. | |
| 7,286,225 B2 | 10/2007 | Aikawa | |
| 7,724,365 B2 | 5/2010 | Fukuda et al. | |
| 2005/0012927 A1 | 1/2005 | Seyfried et al. | |

(Continued)

FOREIGN PATENT DOCUMENTS

| | | |
|---|---|---|
| JP | 2000-199855 A | 7/2000 |
| JP | 2005-315711 A | 11/2005 |

(Continued)

OTHER PUBLICATIONS

Mar. 11, 2014 International Search Report issued in International Patent Application No. PCT/JP2013/083726.
(Continued)

*Primary Examiner* — Jamil Ahmed
(74) *Attorney, Agent, or Firm* — Oliff PLC

(57) ABSTRACT

A spectroscope including: a spectral element that is configured to spectrally separate signal light; a first optical system that is configured to condense spectroscopic light spectrally separated by the spectral element; and an optical receiver that is configured to receive the spectroscopic light; wherein the optical receiver includes a plurality of regions different sensitivities with respect to a wavelength characteristics of the spectroscopic light.

11 Claims, 8 Drawing Sheets

(58) Field of Classification Search
CPC ...... G02B 21/00; G02B 27/09; G11B 7/1367; G11B 7/00; H01L 29/768; G01N 21/64
See application file for complete search history.

(56) References Cited

U.S. PATENT DOCUMENTS

| | | | |
|---|---|---|---|
| 2006/0098555 A1* | 5/2006 | Katsuma | G11B 7/1367 369/112.23 |
| 2006/0114459 A1* | 6/2006 | Aikawa | G01J 3/02 356/328 |
| 2006/0278897 A1* | 12/2006 | Heller | G01J 1/04 257/222 |
| 2013/0120539 A1* | 5/2013 | Foelling | H04N 13/0257 348/49 |
| 2013/0155501 A1* | 6/2013 | Matsumoto | G02B 26/02 359/434 |

FOREIGN PATENT DOCUMENTS

| | | |
|---|---|---|
| JP | 2006-171024 A | 6/2006 |
| JP | 2007-093414 A | 4/2007 |
| JP | 2007-218794 A | 8/2007 |
| JP | 2009-204408 A | 9/2009 |

OTHER PUBLICATIONS

Mar. 11, 2014 Written Opinion of the International Searching Authority issued in International Patent Application No. PCT/JP2013/083726.

Mar. 8, 2016 Office Action issued in Japanese Patent Application No. 2014-554338.

English-language Translation of Japanese Patent Application Publication No. 2000-199855.

\* cited by examiner

SPECTROSCOPE AND MICROSPECTROSCOPIC SYSTEM

CROSS-REFERENCE TO RELATED APPLICATION

Priority is claimed on Japanese Patent Application No. 2012-288637, filed on Dec. 28, 2012. This application is a continuation application of International Patent Application No. PCT/JP2013/083726, filed on Dec. 17, 2013. The contents of the above-mentioned application are incorporated herein by reference.

BACKGROUND

The present invention relates to a spectroscope and a microspectroscopic system.

A fundamental principle of fluorescence microscopes is that it is necessary to separate and detect fluorescence light from excitation light, and thus some form of spectral separation function is required.

An apparatus that guides spectrally-separated fluorescence light to each of a plurality of optical receivers via a mirror array configured of micromirrors has been disclosed as an apparatus that obtains multiple-excitation light and a multiple-fluorescence image of a multi-dyed specimen (see U.S. Pat. No. 7,256,890, for example).

SUMMARY

However, there has been a problem in that in the case where the multiple-fluorescence image has a broad wavelength range, each optical receiver cannot obtain a sufficient amount of signal light.

An object of the aspects of the present invention is to provide a spectroscope in which more favorable signal light can be obtained by an optical receiver, and is to provide a microspectroscopic system including such spectroscope.

According to the first aspect of the present invention, there is provided a spectroscope that includes a spectral element that is configured to spectrally separate signal light, a first optical system that is configured to condense spectroscopic light spectrally separated by the spectral element, and an optical receiver that is configured to receive the spectroscopic light; wherein the optical receiver includes a plurality of regions having different sensitivities with respect to a wavelength characteristics of the spectroscopic light.

In addition, according to the second aspect of the present invention, there is provided a microspectroscopic system that includes a microscope that is configured to scan light from a light source and condense the light onto a specimen via an objective lens, and condense signal light radiated from the specimen via the objective lens, and one of the aforementioned spectroscopes that is configured to spectrally separate and detect the signal light from the microscope.

According to the aspects of the present invention, even in the case where a multiple-fluorescence image has a broad wavelength range, an optical receiver can obtain a signal in an optical receiving region having a better sensitivity.

DESCRIPTION OF EMBODIMENTS

First Embodiment

Figure 1:
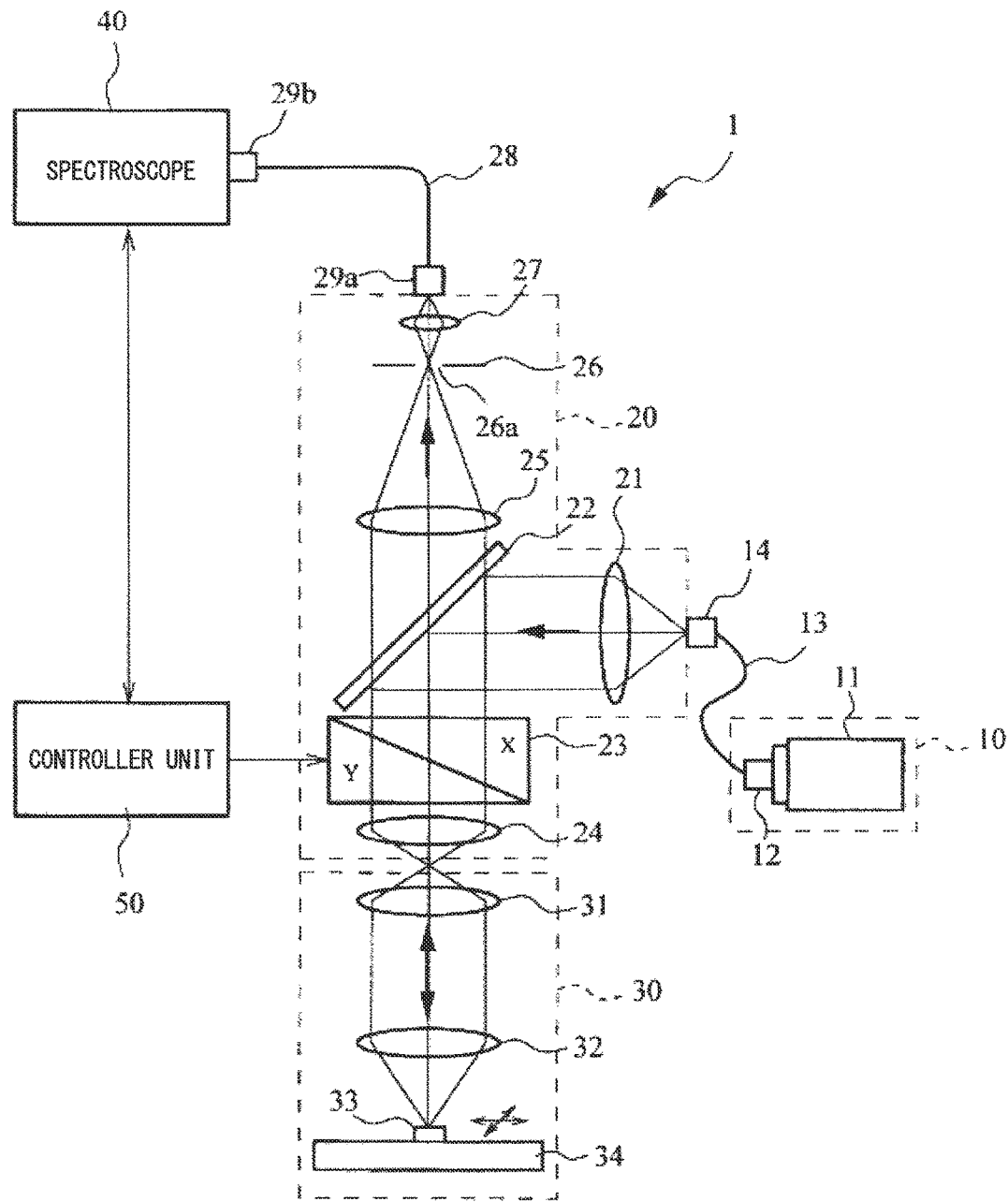
FIG. 1 is a block diagram illustrating the configuration of a microspectroscopic system.

Hereinafter, preferred embodiments of the present invention will be described with reference to the drawings. First, the configuration of a microspectroscopic system having a spectroscope according to a first embodiment will be described using FIGS. 1 to 5. As illustrated in FIG. 1, a microspectroscopic system 1 includes a light source system 10, a confocal microscope having a confocal unit 20 and a microscope 30, a spectroscope 40, and a controller 50. In the microspectroscopic system 1, the confocal unit 20 and the spectroscope 40 are optically connected to each other with an optical fiber 28 via fiber couplers 29a and 29b.

The light source system 10 has a laser device 11, an optical fiber 13, and fiber couplers 12 and 14. The laser device 11 includes a laser diode, for example, and emits illumination light having desired wavelength characteristics. The illumination light is guided to the confocal unit 20 via the optical fiber 13. Note that in the example illustrated in FIG. 1, the illumination light is excitation light for exciting a specimen 33 to emit fluorescence light.

The confocal unit 20 has a collimator lens 21 that causes the illumination light from the light source system 10 to be a substantially collimated light flux, a dichroic mirror 22, a scanning unit 23, a scanner lens 24, a condensing lens 25, a pinhole plate 26 having a pinhole 26a, and a relay lens 27. Moreover, the microscope 30 has a second objective lens 31 and an objective lens 32, as well as a stage 34 on which the specimen 33 is placed. Combining the confocal unit 20 and the microscope 30 configures a scanning confocal microscope. Note that the dichroic mirror 22 is configured to reflect laser light emitted from the light source system 10 to the microscope 30 side and to transmit fluorescence light radiated from the specimen 33 that has been excited by the laser light. Moreover, the focal point of the condensing lens 25 on the image side is disposed to coincide substantially with the pinhole 26a of the pinhole plate 26.

Laser light (excitation light) emitted from the laser device 11 of the light source system 10 that serves as a light source is guided to the optical fiber 13 via the fiber coupler 12. Furthermore, the laser light having passed through the optical fiber 13 is incident on the collimator lens 21 of the confocal unit 20 through the fiber coupler 14. Then, after being converted into substantially collimated light by the collimator lens 21, the laser light is reflected by the dichroic mirror 22 to the optical path on the microscope 30 side and guided to the scanning unit 23 constituted of two galvanometer mirrors arranged to be perpendicular to each other and the scanner lens 24, and the laser light will be two-dimensionally scanned. After caused to be substantially collimated light by the second objective lens 31, the scanned laser light is condensed onto one point on the specimen 33 using the objective lens 32. Note that the position on the specimen 33 in two-dimensional scanning using the scanning unit 23 is controlled by the controller 50 controlling operation of the galvanometer mirrors in the scanning unit 23. Fluorescence light (signal light) radiated from the specimen 33 excited with the laser light is converted into substantially collimated light by the objective lens 32, and returns along the reverse path relative to the path of the laser light (excitation light) to be incident on the dichroic mirror 22. Furthermore, the fluorescence light incident on the dichroic mirror 22 transmits through the dichroic mirror 22 and is condensed on the pinhole 26a of the pinhole plate 26 by the condensing lens 25.

The light that has passed through the pinhole 26a passes through the relay lens 27 and is guided to the optical fiber 28 through the fiber coupler 29a. Upon passing through the relay lens 27, as illustrated in FIG. 1, the light having passed through the pinhole 26a, which would be allowed to be a divergent light flux if left as is, is collected again, and can therefore be incident on an opening end of the optical fiber 28 effectively (with little loss thereof) even in the case of an apparently small opening diameter.

Here, a light collection point formed in the pinhole 26a is an image of a light spot on the specimen 33. As such, even when there is light emitted from any other point on the specimen 33, that light is blocked by the pinhole plate 26 rather than forming an image in the pinhole 26a, and almost does not reach the fiber coupler 29a at all. Therefore, only the light that successfully passes through the pinhole 26a can reach the fiber coupler 29a through the relay lens 27. As a result, the scanning confocal microscope is a microscope that can observe a specimen not only with high horizontal resolution but also with high vertical resolution.

The fluorescence light incident on the fiber coupler 29a transmits through the optical fiber 28 and is guided into the spectroscope 40 through the fiber coupler 29b.

As illustrated in FIG. 2(a), the spectroscope 40 is constituted of: a collimating optical system 41 causing the signal light incident from the optical fiber 28 (fluorescence light in the example of FIG. 1) to be a substantially collimated light flux; a diffraction grating 42 serving as a wavelength dispersion element (called a "spectral element" hereinafter) having spectral characteristics; a reflective mirror array 44 in which minute reflective mirrors (micromirrors) are arranged one-dimensionally or two-dimensionally and that forms a reflecting surface; a condensing optical system 43, serving as a first optical system, that condenses the signal light wavelength-dispersed by the diffraction grating 42 (spectroscopic light) two-dimensionally onto the reflecting surface of the reflective mirror array 44; an optical receiver 46, having an optical receiving element array in which a plurality of optical receiving elements 46b that forms a plurality of detection regions 46a is arranged in an array, that forms an optical receiving region; and a projection optical system 45, serving as a second optical system, that forms the signal light (spectroscopic light) reflected by the reflective mirror array 44 into an image on the optical receiving region of the optical receiver 46. Hereinafter, an optical axis direction of the spectroscope 40 (a central direction in which the signal light emitted from the optical fiber 28 travels) will be described as a Z axis, a horizontal direction within a plane orthogonal to the optical axis as an X axis, and a vertical direction as a Y axis. A reflective mirror array manufactured by Adamant Co., Ltd., in which each micromirror can be set to a desired angle through analog control, is used here as an example, but the reflective mirror array is not limited thereto. The reflective mirror array can be manufactured using a known MEMS technique.

In the spectroscope 40, the collimating optical system 41 causes the signal light introduced through the optical fiber 28 to be substantially collimated light, with which the diffraction grating 42 is then irradiated. The diffraction grating 42 is formed with a plurality of diffraction grating grooves extending in the X-axis direction arranged at minute intervals in the Y-axis direction. Accordingly, the signal light incident on the diffraction grating 42 is diffracted in the Y-axis direction. Here, the diffraction angle is determined by the wavelength thereof, and thus the signal light is dispersed and spectrally separated in the Y-axis direction in accordance with the wavelength thereof. In other words, in a plane orthogonal to the optical axis, a direction of spectral separation by the diffraction grating 42 corresponds to the Y-axis direction and a direction orthogonal to the spectral separation direction corresponds to the X-axis direction. Meanwhile, although illustrated as a reflective type in FIG. 2(a), the diffraction grating 42 can also be configured as a transmissive type. The diffraction grating 42 can also be configured as a relief type or a volume phase holographic grating (VPHG).

Figure 2:
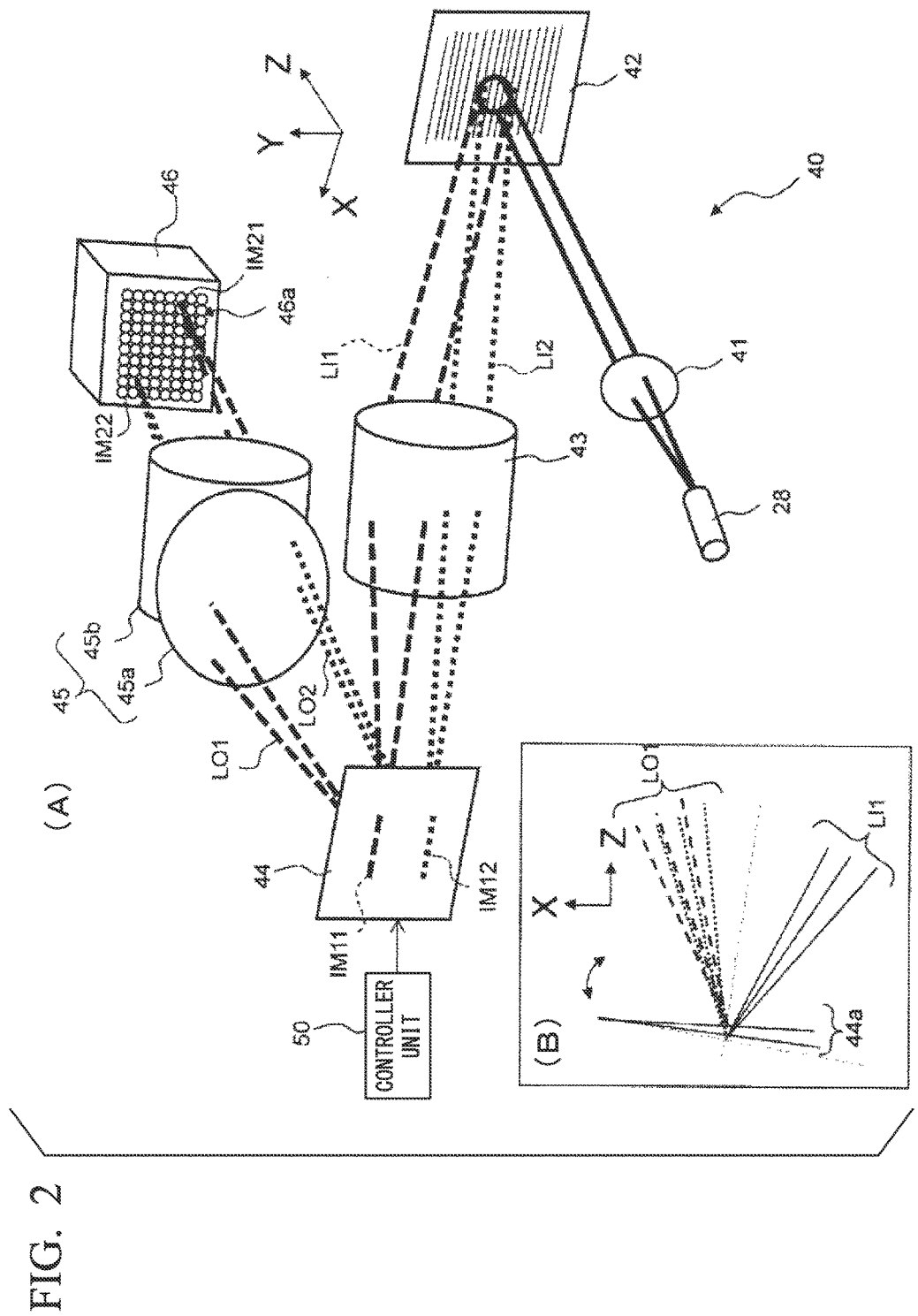
FIG. 2 is an explanatory diagram illustrating a spectroscope according to a first embodiment.

The signal light spectrally separated in this manner (spectroscopic light) enters the condensing optical system 43. The condensing optical system 43 is configured having different refractive powers in the X-axis direction and the Y-axis direction, and in FIG. 2 is configured so that the refractive power in the Y-axis direction is greater than the refractive power in the X-axis direction. For example, a cylindrical lens with refractive power only in the Y-axis direction can be used as this two-dimensional condensing optical system 43. Accordingly, spectroscopic light that has entered the condensing optical system 43 produces an optical pattern having the same lengths in the X-axis direction but different optical wavelengths from line to line arranged in the Y-axis direction, and this optical pattern is then projected onto the reflective mirror array 44. For example, in the case of the configuration illustrated in FIG. 2, spectroscopic light ill diffracted upward in the Y-axis direction by the diffraction grating 42 is condensed by the condensing optical system 43 as an optical pattern IM11 (a line-form image) on an upper side of the reflective mirror array 44 in the Y-axis direction. Meanwhile, spectroscopic light LI2 diffracted downward in the Y-axis direction by the diffraction grating 42 is condensed by the condensing optical system 43 as an optical pattern IM12 (a line-form image) on a lower side of the Y-axis direction of the reflective mirror array 44.

Figure 3:
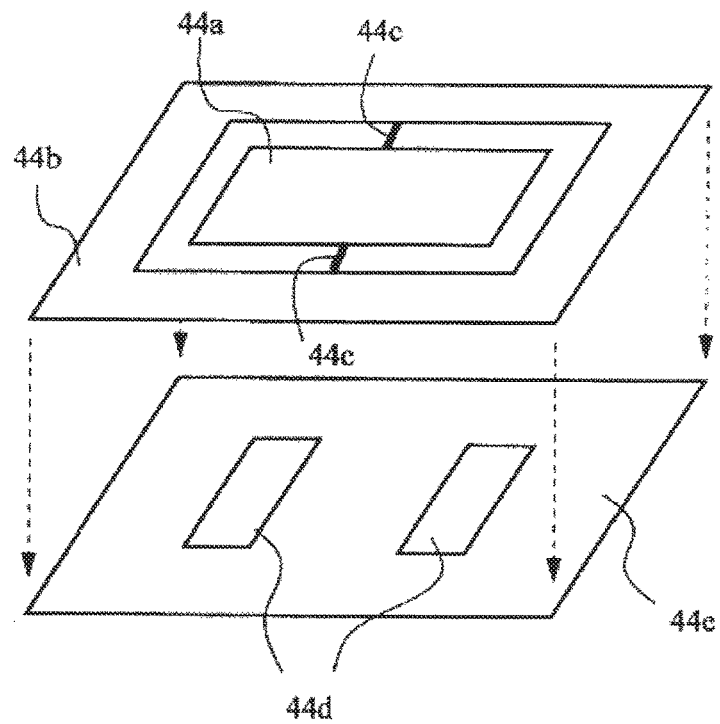
FIG. 3 is an explanatory diagram illustrating the configuration of a reflective mirror array used in the spectroscope according to first and second embodiments.

The reflective mirror array 44 has micromirrors 44a arranged one- or two-dimensionally with a structure such as that illustrated in FIG. 3. In the reflective mirror array 44, electrodes 44d are disposed on a top surface of a driving base portion 44e, and furthermore, a frame 44b is disposed so as to support the micromirrors 44a, which is disposed so as to cover the top surfaces of the electrodes 44d, by using hinges (shafts) 44c. According to this configuration, mirror surfaces of the micromirrors 44a can be tilted (rotated) about the hinges 44c supported by the frame 44b in a predetermined one-dimensional direction (in the present embodiment, the X-axis direction that is substantially orthogonal to the direction of spectral separation) by supplying a voltage on the basis of a signal from the controller 50 to the electrodes 44d disposed on the driving base portion 44e. Because the micromirrors 44a are square or have an aspect ratio close to a square, a two-dimensional arrangement is used in the case where there is not a large divergence between a vertical width and a horizontal width required for the reflective mirror array 44, and by carrying out the same control on each X-axis direction line of the micromirrors 44a arranged in the X-axis direction, a mirror that is essentially narrow in the Y-axis direction and long in the X-axis direction can be realized.

The reflective mirror array 44 is not limited to being constituted by a plurality of micromirrors 44a, and any minute deflection member (array) constituted by minute deflection elements that deflect the spectroscopic light may be used.

Figure 4:
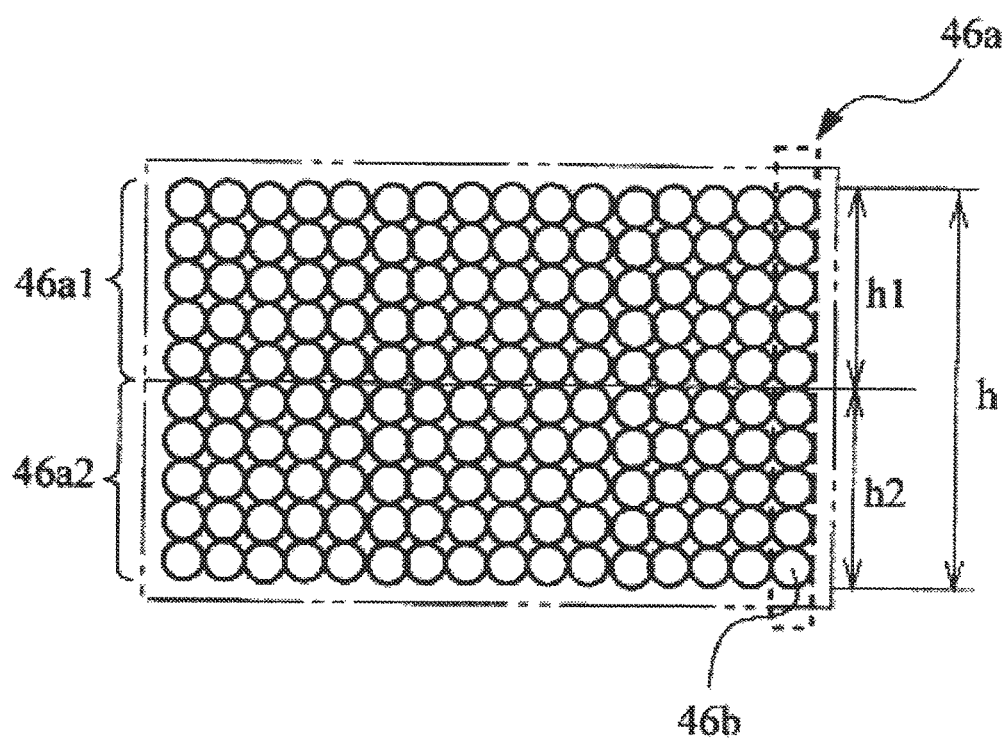
FIG. 4 is an explanatory diagram illustrating the configuration of an optical receiver used in the spectroscope according to the first and second embodiments.

The signal light (spectroscopic light) reflected by the reflective mirror array 44 is guided to the optical receiver 46 by the projection optical system 45. Here, the configuration of the optical receiver 46 according to the first embodiment will be described using FIG. 4. The optical receiver 46 includes detection regions 46a formed as rectangular regions that take the Y-axis direction as long sides and the X-axis direction as short sides, and the plurality of detection regions 46a is arranged in the X-axis direction, or in other words, arranged in an array in a rotation direction of the micromirrors 44a of the reflective mirror array 44. Meanwhile, each of the detection regions 46a is divided into a plurality of sub-regions arranged in the Y-axis direction, or in other words, arranged in a direction in which the signal light is spectrally separated by the diffraction grating 42 that serves as a spectral element. The descriptions here assume that two regions, namely a first sub-region 46a1 and a second sub-region 46a2, are formed. Furthermore, the configuration is such that two or more of the optical receiving elements 46b arranged in the Y-axis direction are disposed in each of the detection regions 46a, and each of the optical receiving elements 46b belongs to one of the aforementioned sub-regions. The optical receiving elements 46b are photoelectric converting elements (PMT). The optical receiving elements 46b disposed in each of the two sub-regions 46a1 and 46a2 illustrated in FIG. 4 are configured to have different photoelectric conversion sensitivities (conversion efficiencies) with respect to the wavelength of incident light in each of the sub-regions 46a1 and 46a2. Although FIG. 4 illustrates the detection regions 46a as being divided into the two sub-regions 46a1 and 46a2, the configuration is not limited thereto, and the detection regions 46a may be divided into three or more regions. Meanwhile, instead of a configuration in which a plurality of circular or elliptical optical receiving elements 46b is arranged in the Y-axis direction in each of the two sub-regions 46a1 and 46a2 and the sensitivities with respect to the wavelength are varied from sub-region to sub-region as illustrated in FIG. 4, the configuration may be such that the optical receiving elements 46b are formed in quadrangular shapes and mutually-adjacent optical receiving elements 46b are disposed in tight contact with each other.

Although an example in which a plurality of optical receiving elements 46a is disposed in each sub-region is illustrated here, it is sufficient for at least one optical receiving element 46a to be disposed in each sub-region.

Meanwhile, the projection optical system 45 is constituted by a first condensing lens 45a having a rotationally symmetric refractive power with respect to the optical axis and a second condensing lens 45b whose refractive power in the Y-axis direction is greater than a refractive power in the X-axis direction, and is designed so that a combined focal length differs between the Y-axis direction and the X-axis direction. A cylindrical lens with refractive power only in the Y-axis direction can be used as the second condensing lens 45b of the projection optical system 45 as well. Note that the order in which the first condensing lens 45a and the second condensing lens 45b are arranged in the optical axis direction may be reversed.

In the first embodiment, the projection optical system 45 is designed so that a focal length thereof in the X-axis direction is equal to a distance L2 between an X-axis direction primary plane of the projection optical system 45 and the optical receiver 46. Accordingly, by controlling a tilt angle of the micromirrors 44a in the reflective mirror array 44 using the controller 50, which detection regions 46a, of the plurality of detection regions 46a that constitutes the optical receiver 46, the signal light (spectroscopic light) is caused to be incident on can be selected depending on the direction in which the signal light (spectroscopic light) is reflected by the micromirrors 44a in the reflective mirror array 44.

Meanwhile, with respect to a focal length in the Y-axis direction, the projection optical system 45 is designed so that the reflective mirror array 44 and the optical receiver 46 are conjugate. In other words, the design is such that a focal length f in the Y-axis direction fulfills the following Formula (1) in the case where a distance between the reflective mirror array 44 and a Y-axis direction primary plane of the projection optical system 45 is L1.

$$f = L1 \times L2 / (L1 + L2) \quad (1)$$

Here, in the case where the optical receiving region of the optical receiver 46 is constituted by the plurality of optical receiving elements 46b arranged in the Y-axis direction as illustrated in FIG. 4, it is necessary to reduce the image in the Y-axis direction of the reflective mirror array 44 to fall within a single detection region 46a. Therefore, it is necessary for a Y-axis direction magnification of the projection optical system 45 to be no greater than a ratio between the size of the detection regions 46a and the size of the reflecting surface of the reflective mirror array 44. Here, the magnification of the projection optical system 45 is equal to a ratio between the aforementioned distance L2 and distance L1, and thus it is necessary to fulfill the relationship indicated in the following Formula (2).

$$L2/L1 \geq \text{Y-axis direction size of detection region/Y-axis direction size of reflecting surface of reflective mirror array} \quad (2)$$

Meanwhile, as described above, the optical receiving region of the optical receiver 46 is divided into a plurality of sub-regions arranged in the Y-axis direction (wavelength dispersion direction). A wavelength band required to be detected by the optical receiver 46 is from $\lambda s$ to $\lambda f$ (where $\lambda s < \lambda f$), and a boundary wavelength between pre-set wavelength ranges detected in the first sub-region 46a1 and in the second sub-region 46a2, respectively, is taken as $\lambda o$. Meanwhile, the first sub-region 46a1 is set as an optical receiving region highly efficient with respect to light from the wavelength $\lambda s$ to $\lambda o$, and the second sub-region 46a2 is set as an optical receiving region highly efficient with respect to light from the wavelength $\lambda o$ to $\lambda f$. When a height of the optical receiving region of the optical receiver 46 (detection regions 46a) in the Y-axis direction (the wavelength dispersion direction) is taken as h, a height of the first sub-region 46a1 is taken as h1, and a height of the second sub-region 46a2 is taken as h2, it is preferable that the optical receiving region be divided as indicated by the following Formula (3).

$$h1=h\times(\lambda o-\lambda s)/(\lambda f-\lambda s)$$

$$h2=h\times(\lambda f-\lambda o)/(\lambda f-\lambda s) \quad (3)$$

Figure 5:
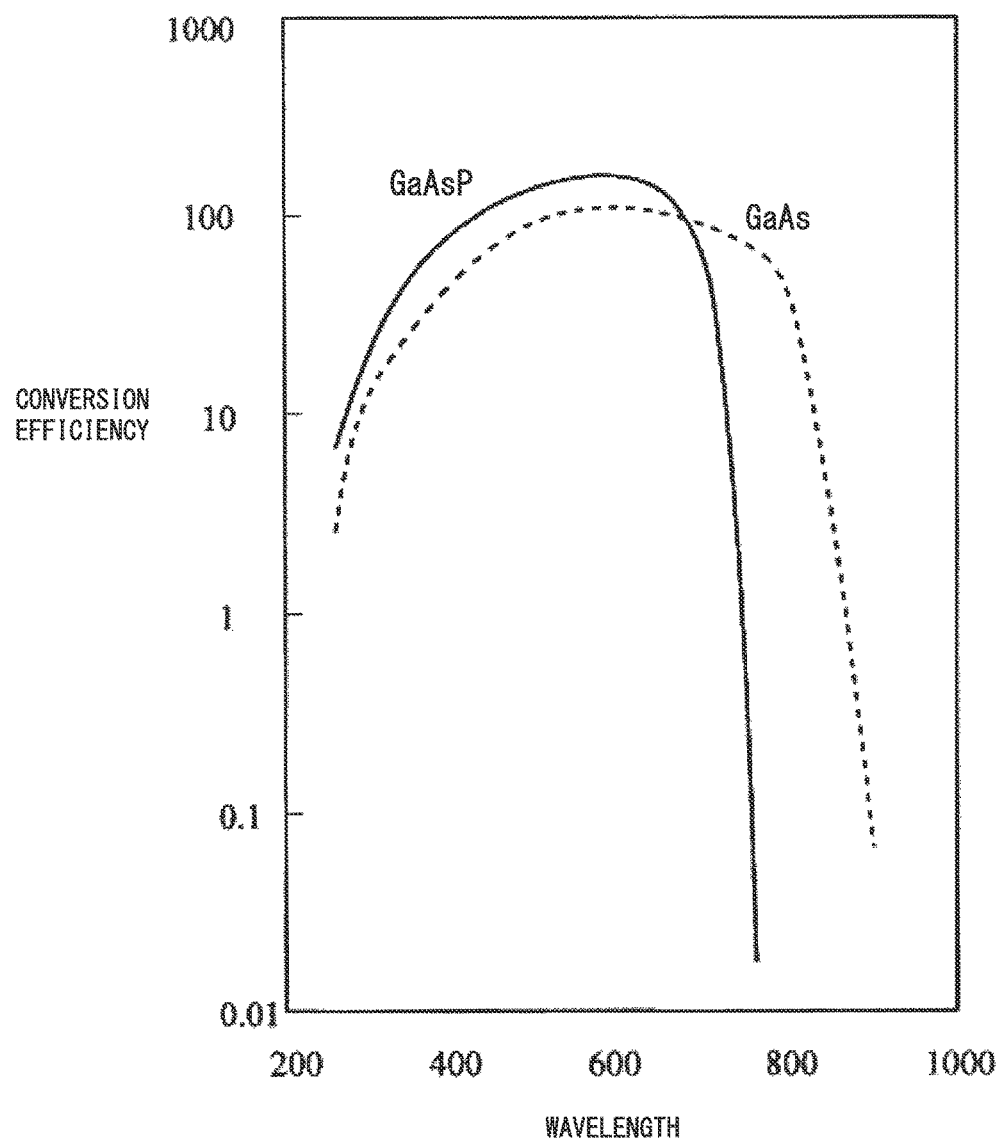
FIG. 5 is a graph illustrating a relationship between a wavelength produced by a crystal photoelectric element of an optical receiver and a conversion efficiency (sensitivity).

For example, consider a case of creating the optical receiving region having a sensitivity from 500 to 900 nm by using a crystal photoelectric surface of gallium arsenide phosphide (GaAsP) for the first sub-region 46a1 and a crystal photoelectric surface of gallium arsenide (GaAs) for the second sub-region 46a2, as illustrated in FIG. 5. In this case, different sub-regions are used (selected) for detection taking 700 nm as a boundary, and thus the respective sizes of the first and second sub-regions 46a1 and 46a2 are as follows.

$$h1(GaAsP)=h\times(700-500)/(900-500)=0.5h$$

$$h2(GaAs)=h\times(900-700)/(900-500)=0.5h$$

Through this, in the spectroscope 40 according to the first embodiment, spectrally-separated signal light at different wavelengths is incident on each of the lines constituted by the micromirrors 44a arranged in the X-axis direction of the reflective mirror array 44, and thus which detection regions 46a the spectrally-separated signal light will be incident on can be controlled on a wavelength-by-wavelength basis by controlling the tilt angle of the micromirrors 44a on a line-by-line basis, as illustrated in FIG. 2(b). For example, reflected light LO1 of the optical pattern IM11 condensed on an upper side of the reflective mirror array 44 in the Y-axis direction is condensed on the detection regions 46a on a left side in the X-axis direction and forms an image IM21, and reflected light LO2 of the optical pattern IM12 condensed on a lower side of the reflective mirror array 44 in the Y-axis direction is condensed on the detection regions 46a on a right side in the X-axis direction and forms an image IM22. At this time, which of the first and second sub-regions 46a1 and 46a2 the image is formed on in each of the detection regions 46a is determined by the direction of spectral separation by the diffraction grating 42, or in other words, by the wavelength of the spectrally-separated light. Accordingly, by using the aforementioned Formula (3) to set the first and second sub-regions 46a1 and 46a2 to suitable sizes, each spectroscopic light can be condensed onto sub-regions having good sensitivity to each wavelength of light regardless of the orientation (tilt angle) of the micromirrors 44a in the reflective mirror array 44.

Note that each of the optical receiving elements 46b disposed in the detection regions 46a of the optical receiver 46 detects the intensity of the spectroscopic light incident on that optical receiving element 46b, and the detection values are passed to the controller 50. The controller 50 then carries out calculation processing and outputs a resultant as an image to a display device or the like (not illustrated).

A specific design means of the spectroscope 40 according to the first embodiment will be described hereinafter. Note that the descriptions assume that cylindrical lenses having refractive power only in the Y-axis direction are used for the condensing optical system 43 and the second condensing lens 45b.

First, it is sufficient for a width of a light beam after transmitting through the collimating optical system 41 to be approximately equal to the horizontal width (X-axis direction width) of the reflective mirror array 44, and thus assuming the X-axis direction width of the reflective mirror array 44 is W, it is sufficient that a focal length fc of the collimating optical system 41 fulfill the following conditional expression (4). Note that NAf represents a numerical aperture of the optical fiber 28.

$$W=2\times fc\times NAf \quad (4)$$

Next, with respect to a Y-axis direction focal length f1 of the condensing optical system (cylindrical lens) 43, a diffraction grating 42 having a grating constant d is used to spectrally separate and detect the signal light in a wavelength range from λ1 to λ2. Assuming that an angle of incidence on the diffraction grating 42 is θ1, an exit angle θ2 from the diffraction grating 42 is within a range from $\sin^{-1}(\lambda 1/d-\sin\theta 1)$ to $\sin^{-1}(\lambda 2/d-\sin\theta 1)$. Accordingly, a half angle Δθ of the spectroscopic light exiting from the diffraction grating 42 is expressed through the following Formula (5).

$$\Delta\theta=(\sin^{-1}(\kappa 2/d-\sin\theta 1)-\sin^{-1}(\kappa 1/d-\sin\theta 1))/2 \quad (5)$$

Accordingly, when a Y-axis direction pixel pitch of the micromirrors 44a in the reflective mirror array 44 is represented by PSLM and a number of pixels arranged in the Y-axis direction is represented by NSLM, it is sufficient for the Y-axis direction focal length f1 of the condensing optical system 43 to fulfill the following conditional expression (6).

$$2\times f1\times\sin\Delta\theta=PSLM\times NSLM \quad (6)$$

Finally, with respect to the focal length of the projection optical system 45, there are an X-axis direction focal length f2T and a Y-axis direction focal length f2L, and these are determined as follows.

First, assuming that a horizontal width (X-axis direction width) of a single detection region 46a in the optical receiver 46 is WdT, that Nd detection regions 46a are arranged in the X-axis direction, and that each of the micromirrors 44a of the reflective mirror array 44 has an angle of deflection ±αm, it is sufficient for the X-axis direction focal length f2T of the projection optical system 45 to fulfill the relationship indicated in the following Formula (7).

$$f2T\times\sin\alpha m=WdT\times Nd/2 \quad (7)$$

Note that in the case where the optical receiving region of the optical receiver 46 is formed of a plurality of optical receiving elements 46b as illustrated in FIG. 4, a vertical width (Y-axis direction width (height h)) of the reflective mirror array 44 is expressed as PSLM×NSLM. As such, it is sufficient for a Y-axis direction component of the spectroscopic light reflected by the reflective mirror array 44 to be condensed by the projection optical system 45 within a vertical width (Y-axis direction width) WdL of the detection regions 46a, and thus it is sufficient for a magnification M of the projection optical system 45 to fulfill the following Formula (8).

$$M=WdL/(PSLM\times NSLM) \quad (8)$$

Meanwhile, the distance L2 from the projection optical system 45 to the optical receiver 46 is equal to the X-axis direction focal length f2T of the projection optical system 45, and thus assuming the distance between the reflective mirror array 44 and the Y-axis direction primary plane of the projection optical system 45 is L1, the Y-axis direction focal length f2L of the projection optical system 45 is expressed through the following Formula (9), using the relationship indicated in the aforementioned Formula (1).

$$f2L=L1\times f2T/(L1+f2T) \quad (9)$$

In an optical system designed in this manner, when the spectroscopic light is incident on a detection region 46a in a kth position in the X-axis direction relative to the optical axis, it is sufficient to control a tilt α of the micromirrors 44a reflecting the fluorescence light wavelength thereof in the reflective mirror array 44 as indicated by the following Formula (10). Note that which detection region 46a to cause each wavelength of spectroscopic light spectrally separated by the diffraction grating 42 to be incident on can be selected by controlling the tilt angle of the micromirrors 44a in the reflective mirror array 44 on the basis of a signal calculated by the controller 50 using the aforementioned method of calculating on the basis of user settings, (for example, selecting a detection region 46a in the optical receiver 46 to be used, specifying a fluorescent dye (storing a correspondence chart for fluorescent dyes and fluorescence light wavelengths in a storage unit in the controller 50), specifying a fluorescence light wavelength region to be obtained (a detected wavelength range), an excitation wavelength, and the like), or using a method of calculating, mentioned later.

$$\alpha = \sin^{-1}(k \times WdT/f2T) \quad (10)$$

Although it is desirable for the micromirrors 44a in the reflective mirror array 44 to be arranged one-dimensionally in the Y-axis direction in the case of an optical arrangement such as that described in the first embodiment, the micromirrors 44a may be arranged two-dimensionally instead. In this case, it is sufficient for control to be carried out so that the micromirrors 44a arranged in the X-axis direction and having the same height in the Y-axis direction have the same angle of reflection.

With respect to light having a wavelength not desirable to be incident on the detection regions 46a, such as the excitation light used in fluorescence light detection, increasing the tilt of the micromirrors 44a in the reflective mirror array 44 that correspond to that wavelength of light enables such light to be scattered in directions that are not incident on any of the detection regions 46a. In the stated design means, setting the detection regions 46a that constitute the optical receiver 46 positioned furthest on the ends thereof to be blank and controlling the reflective mirror array 44 so that the excitation light that need not be detected is condensed onto those positions makes it possible to prevent unnecessary light from being incident on the optical receiver 46.

In this manner, in the spectroscope 40 according to the first embodiment, selecting a single detection region 46a from the plurality of detection regions 46a that constitutes the optical receiver 46 and causing the spectroscopic light to be incident on that detection region 46a by rotating (pivoting) the micromirrors 44a that constitute the reflective mirror array 44 in the X-axis direction enables a wavelength resolution, acquisition wavelength region, and the like to be varied as desired. In addition, the entirety of a reflective mirror array 44 on which the spectrally-separated light is projected can be projected onto a single detection region 46a. Meanwhile, each of the detection regions 46a is constituted by a plurality of sub-regions (the two sub-regions 46a1 and 46a2, in FIG. 4) arranged in the Y-axis direction, and the configuration is such that each sub-region has a different sensitivity to the wavelength of the light incident thereof and the light spectrally-separated by the diffraction grating 42 is condensed onto the sub-region having the optimal sensitivity in accordance with the wavelength of that light. Accordingly, the fluorescence light wavelength can be continually obtained in an optical receiving region having the optimal sensitivity, even when the wavelength resolution, the acquired wavelength band, and the like are changed.

Furthermore, the micromirrors 44a in the reflective mirror array 44 on which the excitation light is incident can deflect in the predetermined direction by controlling the tilt angle of the micromirrors 44a so that the excitation light is not incident on the optical receiver 46.

Meanwhile, because the spectroscope 40 according to the first embodiment uses the optical fiber 28 as its incident end, the spectroscope 40 can easily be connected to the confocal microscope. In other words, a confocal microscope generally performs the optical detection with light detector connected to the pinhole, and thus causing the light that has passed through the pinhole to be incident on the optical fiber enables the light to be introduced into the light detector with ease using the optical fiber. In this way, a spectroscope suitable for a confocal microscope having a spectral separation function can be configured.

Second Embodiment

Figure 6:
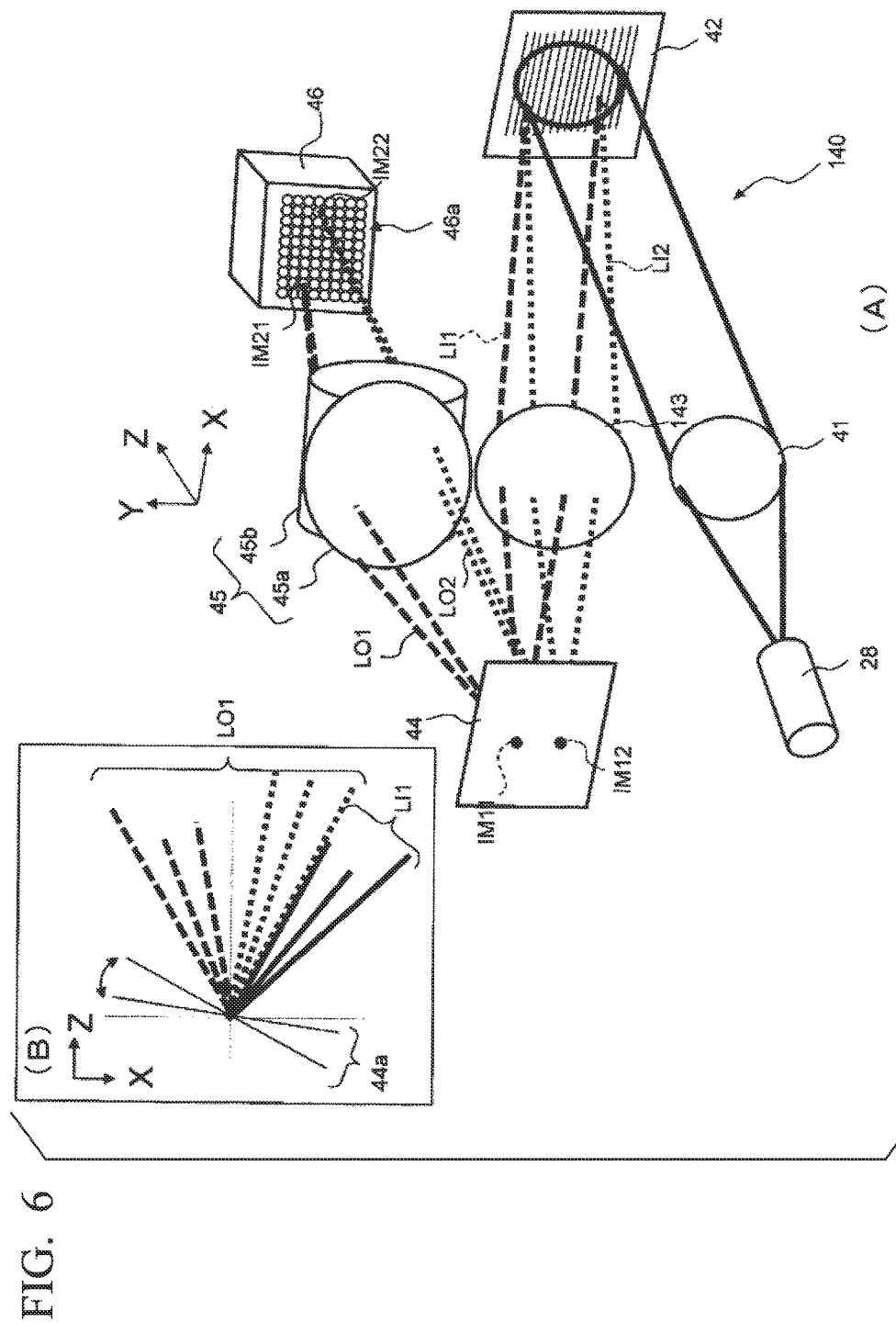
FIG. 6 is an explanatory diagram illustrating a spectroscope according to the second embodiment.

FIG. 6 illustrates the configuration of a spectroscope 140 according to a second embodiment. Differences from the spectroscope 40 according to the first embodiment are that an exit end of the optical fiber 28 is in a conjugate relationship with the reflective mirror array 44 in the horizontal direction (the X-axis direction in an XZ cross-section), and that the diffraction grating 42 and the optical receiving region of the optical receiver 46 are similarly in a conjugate relationship in the horizontal direction (the X-axis direction). Note that relationships in the vertical direction (the Y-axis direction) are the same as in the first embodiment. Constituent elements that are the same as those in the first embodiment are given the same reference numerals, and detailed descriptions thereof will be omitted.

As illustrated in FIG. 6(a), the spectroscope 140 is constituted of: the collimating optical system 41 causing the signal light incident from the optical fiber 28 to be a substantially collimated light flux; the diffraction grating 42 serving as a wavelength dispersion element (a spectral element) having spectral characteristics; the reflective mirror array 44 in which micromirrors are arranged two-dimensionally; a condensing optical system 143 that condenses the signal light wavelength-dispersed by the diffraction grating 42 (spectroscopic light) one-dimensionally onto the reflecting surface of the reflective mirror array 44; the optical receiver 46, having an optical receiving element array in which a plurality of optical receiving elements 46b that forms a plurality of detection regions 46a is arranged in an array in the X-axis direction; and the projection optical system 45 that forms the light reflected by the reflective mirror array 44 into an image on the optical receiving region of the optical receiver 46.

In the spectroscope 140, the collimating optical system 41 causes the signal light introduced via the optical fiber 28 to be substantially collimated light, with which the diffraction grating 42 is then irradiated. This signal light is dispersed by the diffraction grating 42 at different angles from wavelength to wavelength, and is then condensed onto the reflective mirror array 44 by the condensing optical system 143. Note that the reflective mirror array 44 has the configuration illustrated in FIG. 3, in the same manner as in the first embodiment. Meanwhile, in the second embodiment, the condensing optical system 143 has a rotationally symmetric refractive power with respect to the optical axis. Accordingly, spectroscopic light LI1 diffracted upward in the Y-axis direction by the diffraction grating 42 is condensed by the condensing optical system 143 as a point image IM11 on an upper side of the reflective mirror array 44 in the Y-axis direction. Meanwhile, spectroscopic light LI2 diffracted downward in the Y-axis direction by the diffraction grating 42 is condensed by the condensing optical system 143 as a point image IM12 on a lower side of the Y-axis direction of the reflective mirror array 44.

The spectroscopic light reflected by the reflective mirror array 44 is guided to the optical receiver 46 by the projection optical system 45. Here, as in the first embodiment, the projection optical system 45 is constituted by the first condensing lens 45a having a rotationally symmetric refractive power with respect to the optical axis and the second condensing lens 45b constituted by a cylindrical lens, for example, and is designed so that a combined focal length differs between the Y-axis direction and the X-axis direction.

In addition, as in the first embodiment, the focal length of the projection optical system 45 in the X-axis direction is designed to be equal to a distance L22 between the X-axis direction primary plane of the projection optical system 45 and the optical receiver 46 in the second embodiment as well, and as illustrated in FIG. 6(b), which detection regions 46a, of the plurality of detection regions 46a that constitutes the optical receiver 46, the signal light is caused to be incident on can be selected depending on the direction in which the signal light (the spectroscopic light LI1) is reflected by the micromirrors 44a in the reflective mirror array 44 (the direction of the reflected light L01).

Meanwhile, with respect to the focal length of the projection optical system 45 in the Y-axis direction, the projection optical system 45 is designed so that the reflective mirror array 44 and the optical receiver 46 are conjugate, as in the first embodiment. In other words, the focal length f is set to fulfill the relationship indicated by the following Formula (11) in the case where a distance between the reflective mirror array 44 and a Y-axis direction primary plane of the projection optical system 45 is L21.

$$f = L21 \times L22/(L21+L22) \quad (11)$$

As in the first embodiment, in the case where the optical receiving region of the optical receiver 46 is constituted by the plurality of optical receiving elements 46b arranged in the Y-axis direction as illustrated in FIG. 4, it is necessary for the image on the reflective mirror array 44 to fall within a single detection region 46a. Therefore, it is necessary for the Y-axis direction magnification of the projection optical system 45 to be no greater than a ratio between the size of the detection regions 46a and the size of the reflecting surface of the reflective mirror array 44. Here, the magnification of the projection optical system 45 is equal to a ratio between the distance L22 and a distance L21, and thus it is necessary to fulfill the relationship indicated in the following Formula (12).

$$L22/L21 \leq Y\text{-axis direction size of detection region}/Y\text{-axis direction size of reflecting surface of reflective mirror array} \quad (12)$$

Meanwhile, respective heights h1 and h2 of the two sub-regions 46a1 and 46a2 that constitute the detection regions 46a of the optical receiver 46 (where the height of a single optical receiving element 46a is taken as h) are as described earlier using Formula (3).

A specific design means of the spectroscope 140 according to the second embodiment will be described hereinafter. Note that the descriptions assume that a cylindrical lenses having refractive power only in the Y-axis direction is used for the second condensing lens 45b.

First, it is sufficient for a width of a light beam after passing through the collimating optical system 41 to be approximately equal to the horizontal width (X-axis direction width) of the detection regions 46a, and thus assuming the X-axis direction width of the reflective mirror array 44 is W', it is sufficient that the focal length fc of the collimating optical system 41 fulfill the relationship indicated in the following conditional expression (13). Note that NAf represents the numerical aperture of the optical fiber 28, and f22T and f21 represent the X-axis direction focal length of the projection optical system 45 and the focal length of the condensing optical system 143, respectively, determined through the following formula (13).

$$W' = (f22T/f21) \times 2 \times fc \times NAf \quad (13)$$

Next, with respect to a focal length f21 of the condensing optical system 143, a diffraction grating 42 having the grating constant d is used to detect the signal light in a wavelength range from λ1 to λ2. Assuming that the angle of incidence on the diffraction grating 42 is θ1, the exit angle θ2 from the diffraction grating 42 is within a range from $\sin^{-1}(\kappa 1/d - \sin\theta 1)$ to $\sin^{-1}(\lambda 2/d - \sin\theta 1)$. Accordingly, the half angle Δθ of the spectroscopic light exiting from the diffraction grating 42 is expressed through Formula (5), indicated in the first embodiment. Accordingly, when the Y-axis direction pixel pitch of the micromirrors 44a in the reflective mirror array 44 is represented by PSLM and the number of pixels arranged in the Y-axis direction is represented by NSLM, it is sufficient for the focal length f21 of the condensing optical system 143 to fulfill the following conditional expression (14).

$$2 \times f21 \times \sin\Delta\theta = PSLM \times NSLM \quad (14)$$

Finally, with respect to the focal length of the projection optical system 45, there are an X-axis direction focal length f22T and a Y-axis direction focal length f22L, and these are determined as follows.

First, assuming that a horizontal width (X-axis direction width) of a single detection region 46a in the optical receiver 46 is WdT, that Nd detection regions 46a are arranged in the X-axis direction, and that each of the micromirrors 44a in the reflective mirror array 44 has an angle of deflection ±αm, it is sufficient for the X-axis direction focal length f22T of the projection optical system 45 to fulfill the relationship indicated in the following Formula (15).

$$f22T \times \sin\alpha m = WdT \times Nd/2 \quad (15)$$

Note that in the case where the optical receiving region of the optical receiver 46 is formed of a plurality of optical receiving elements 46b as illustrated in FIG. 4(b), a vertical width (Y-axis direction width) of the reflective mirror array 44 is expressed as PSLM×NSLM. As such, it is sufficient for light, of the spectroscopic light reflected by the reflective mirror array 44, that extends in the Y-axis direction to be condensed by the projection optical system 45 within a vertical width (Y-axis direction width) WdL of the detection regions 46a, and thus it is sufficient for the magnification M of the projection optical system 45 to fulfill Formula (8) indicated in the first embodiment.

Meanwhile, the distance L22 from the projection optical system 45 to the optical receiver 46 is equal to the horizontal direction focal length f22T of the projection optical system 45, and thus assuming the distance between the reflective mirror array 44 and the Y-axis direction primary plane of the projection optical system 45 is L21, the Y-axis direction focal length f22L of the projection optical system 45 is expressed through the following Formula (16), using the relationship indicated in the aforementioned Formula (11).

$$f22L = L21 \times f22T/(L21+f22T) \quad (16)$$

In an optical system designed in this manner, when incident on a detection region 46a in a kth position in the X-axis direction relative to the optical axis, it is sufficient to control the tilt a of the micromirrors 44a reflecting the fluorescence light wavelength thereof in the reflective mirror array 44 as indicated by the following Formula (17).

$$\alpha = \sin^{-1}(k \times WdT/f22T) \quad (17)$$

For example, as illustrated in FIG. 6(a), the reflected light LO1 of the point image IM11 condensed on an upper side of the reflective mirror array 44 in the Y-axis direction is condensed on the detection regions 46a on a left side in the X-axis direction and forms an image IM21, and reflected light LO2 of the point image IM12 condensed on a lower side of the reflective mirror array 44 in the Y-axis direction is condensed on the detection regions 46a on a right side in the X-axis direction and forms an image IM22. At this time, the images IM21 and IM22 of the point images IM11 and IM12 formed by the projection optical system 45 have a line-shaped optical pattern extending in the X-axis direction.

Although it is desirable for the micromirrors 44a in the reflective mirror array 44 to be arranged one-dimensionally in the Y-axis direction in the second embodiment as well, the micromirrors 44a may be arranged two-dimensionally instead. In this case, it is sufficient for control to be carried out so that the micromirrors 44a arranged in the X-axis direction and having the same height in the Y-axis direction have the same angle of reflection.

The reflective mirror array 44 is not limited to being constituted by a plurality of micromirrors 44a, and any minute deflection element member (array) constituted by minute deflection elements that deflect the spectroscopic light may be used.

Although images extend as lines in the X-axis direction on the reflective mirror array 44 in the first embodiment, point images are employed in the second embodiment, and thus configuring the spectroscope 140 according to the second embodiment as described above makes it possible to reduce the size of the elements in the reflective mirror array 44.

Third Embodiment

Figure 7:
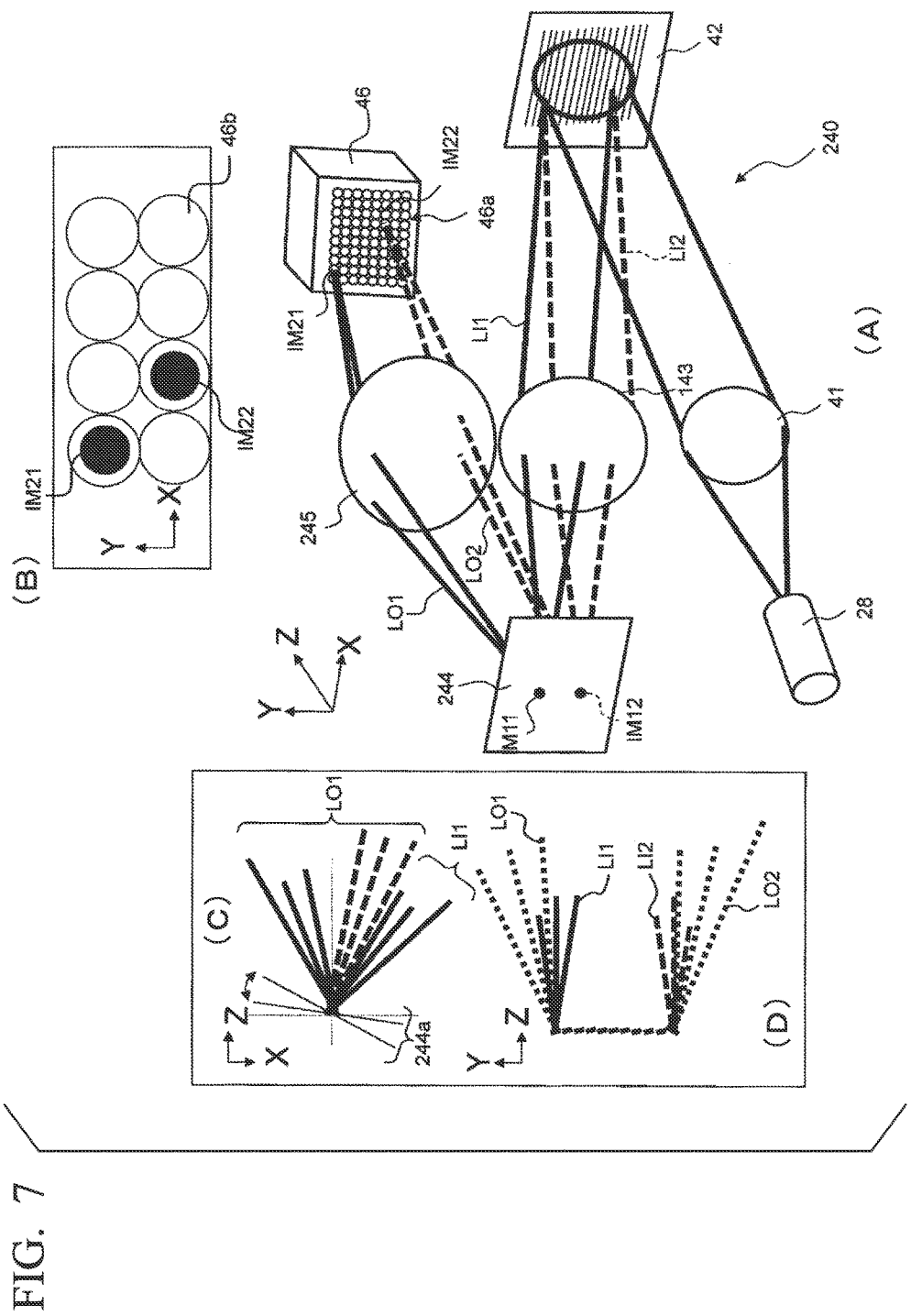
FIG. 7 is an explanatory diagram illustrating a spectroscope according to a third embodiment.

FIG. 7 illustrates the configuration of a spectroscope 240 according to a third embodiment. Differences from the spectroscopes 40 and 140 according to the first and second embodiments are that an exit end of the optical fiber 28 is in a conjugate relationship with a reflective mirror array 244 in the vertical direction (the Y-axis direction in a YZ cross-section) and the horizontal direction (the X-axis direction in an XZ cross-section), and that the diffraction grating 42 and the optical receiving region of the optical receiver 46 are similarly in a conjugate relationship. Constituent elements that are the same as those in the first and second embodiments are given the same reference numerals, and detailed descriptions thereof will be omitted.

As illustrated in FIG. 7(a), the spectroscope 240 is constituted of: the collimating optical system 41 causing the signal light incident from the optical fiber 28 to be a substantially collimated light flux; the diffraction grating 42 serving as a wavelength dispersion element (a spectral element) having spectral characteristics; the reflective mirror array 244 in which minute reflective mirrors (micromirrors) are arranged two-dimensionally; the condensing optical system 143 that condenses the signal light wavelength-dispersed by the diffraction grating 42 (spectroscopic light) one-dimensionally onto the reflective mirror array 244; the optical receiver 46, having an optical receiving element array in which a plurality of optical receiving elements 46b that forms the detection regions 46a is arranged in an array in the X-axis direction; and a projection optical system 245 that forms the light reflected by the reflective mirror array 244 into an image on the optical receiving region of the optical receiver 46. The detection regions 46a are divided into the first sub-region 46a1 and the second 46a2 as illustrated in FIG. 4.

In the spectroscope 240, the collimating optical system 41 causes the signal light introduced through the optical fiber 28 to be substantially collimated light, with which the diffraction grating 42 is then irradiated. The observed light is dispersed by the diffraction grating 42 at different angles from wavelength to wavelength, and is then condensed onto the reflective mirror array 244 by the condensing optical system 143. In the third embodiment, the condensing optical system 143 has a rotationally symmetric refractive power with respect to the optical axis, in the same manner as in the second embodiment. Accordingly, the spectroscopic light LI1 diffracted upward in the Y-axis direction by the diffraction grating 42 is condensed by the condensing optical system 143 as the point image IM11 on an upper side of the reflective mirror array 244 in the Y-axis direction, as illustrated in FIGS. 7(a) and 7(b). Meanwhile, the spectroscopic light LI2 diffracted downward in the Y-axis direction by the diffraction grating 42 is condensed by the condensing optical system 143 as the point image IM12 on a lower side of the Y-axis direction of the reflective mirror array 244.

Figure 8:
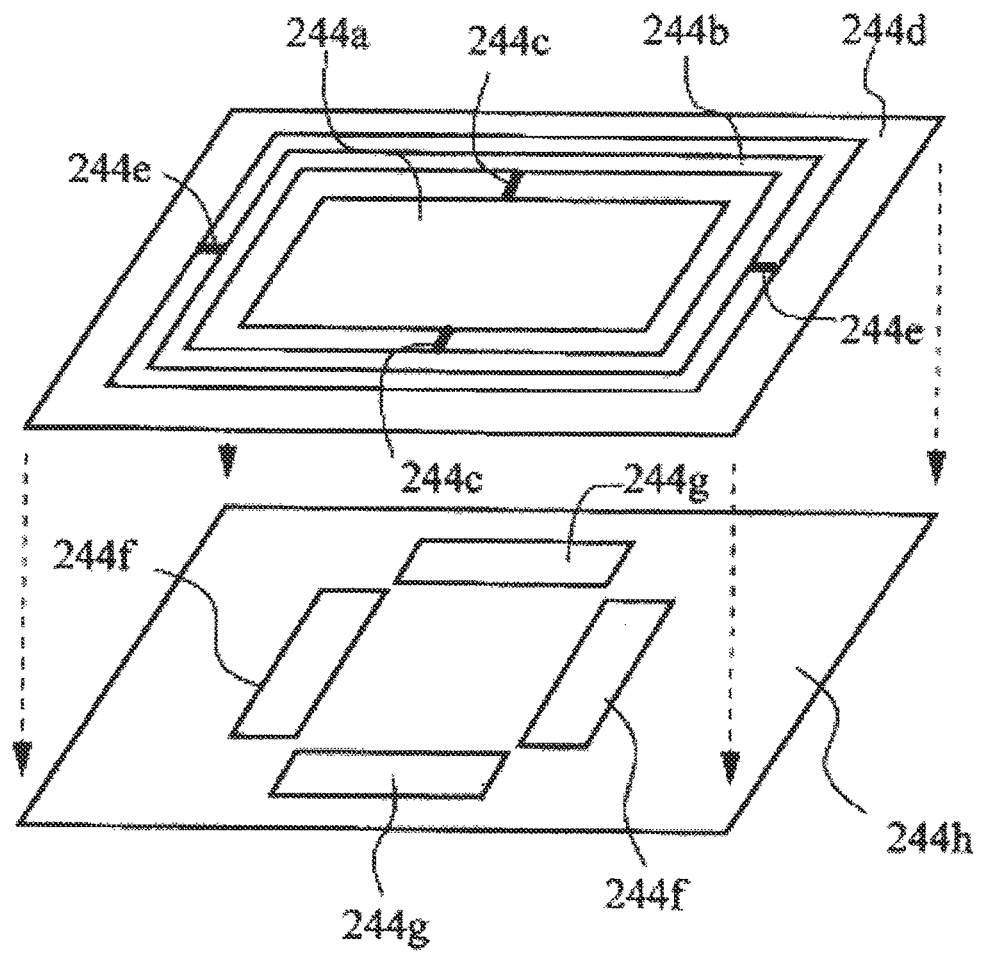
FIG. 8 is an explanatory diagram illustrating the configuration of a reflective mirror array used in the spectroscope according to the third embodiment.

Unlike the first and second embodiments, the mirror surfaces of the reflective mirror array 244 can be tilted not only in the aforementioned predetermined one-dimensional direction (the X-axis direction), but also in a direction substantially orthogonal to that one-dimensional direction (that is, in the Y-axis direction). In other words, the mirror surfaces can be tilted along two axes corresponding to the X-axis direction and the Y-axis direction, respectively. For example, as illustrated in FIG. 8, in the reflective mirror array 244, two sets of electrodes (first electrodes 244f and second electrodes 244g) are disposed on a top surface of a driving base portion 244h. Furthermore, a first frame 244b is disposed so as to support micromirrors 244a, which is disposed so as to cover the top surfaces of the electrodes, by using first hinges (shafts) 244c, and a second frame 244d is disposed so as to support the first frame 244b using second hinges (shafts) 244e. The configuration is such that the mirror surface of each of the micromirrors 244a can be tilted about the first hinges 244c supported by the first frame 244b in the X-axis direction by supplying a voltage to the first electrodes 244f, and furthermore, the first frame 244b can tilt the stated mirror surfaces about the second hinges 244e supported by the second frame 244d in the Y-axis direction by supplying a voltage to the second electrodes 244g.

The spectroscopic light reflected by the reflective mirror array 244 is guided to the optical receiver 46 by the projection optical system 245. Here, unlike in the first and second embodiments, the projection optical system 245 has the same focal length in the Y-axis direction and the X-axis direction. For example, the projection optical system 245 is configured having rotationally symmetric refractive power with respect to the optical axis. In the third embodiment, the optical receiver 46 is disposed at a rear-side focal position of the projection optical system 245 with respect to the Y-axis direction (direction of spectral separation) in a plane substantially orthogonal to the optical axis of the projection optical system 245. In other words, the focal length of the projection optical system 245 is designed to be equal to the distance L2 between the primary plane of the projection optical system 245 and the optical receiver 46, and as illustrated in FIGS. 7A, 7C, and 7D, which optical receiving elements 246a, of a plurality of optical receiving elements 246a that constitutes an optical receiver 246, the signal light is caused to be incident on can be selected depending on the direction in which the signal light (the spectroscopic light Ll1) is reflected by the micromirrors 244a in the reflective mirror array 244 (the direction of the reflected light L01).

A specific design means of the spectroscope 240 according to the third embodiment will be described hereinafter.

First, it is sufficient for a diameter obtained by multiplying the diameter of a light beam after passing through the collimating optical system 41 by a magnification determined by the condensing optical system 143 and the projection optical system 245 to be set to be equal to the diameter of the optical receiving elements 46b, and thus when the diameter of the optical receiving elements 46b is represented by (I), it is sufficient for the focal length fc of the collimating optical system 41 to fulfill the relationship indicated by the following Formula (18). Note that NAf represents the numerical aperture of the optical fiber 28, and f32 and f31 represent the focal length of the projection optical system 245 and the focal length of the condensing optical system 143, respectively, determined through the following formula.

$$\Phi \geq (f32/f31) \times 2 \times fc \times NAf \quad (18)$$

Next, with respect to a focal length f31 of the condensing optical system 143, a diffraction grating 42 having the grating constant d is used to detect the signal light in a wavelength range from λ1 to λ2. Assuming that the angle of incidence on the diffraction grating 42 is θ1, the exit angle θ2 from the diffraction grating 42 is within a range from $\sin^{-1}(\lambda 1/d - \sin\theta 1)$ to $\sin^{-1}(\lambda 2/d - \sin\theta 1)$. Accordingly, the half angle Δθ of the spectroscopic light exiting from the diffraction grating 42 is expressed through Formula (5), indicated in the first embodiment. Accordingly, when the Y-axis direction pixel pitch of the micromirrors 244a in the reflective mirror array 244 is represented by PSLM and the number of pixels arranged in the Y-axis direction is represented by NSLM, it is sufficient for the focal length f31 of the condensing optical system 143 to fulfill the following conditional expression (19).

$$2 \times f31 \times \sin \Delta\theta = PSLM \times NSLM \quad (19)$$

Finally, the focal length of the projection optical system 245 is determined as follows.

As illustrated in FIG. 7(b), it is assumed that the optical receiving elements 46b are arranged two-dimensionally, with the vertical width (Y-axis direction width) of the optical receiving elements 46b being WdL with Nd columns of the optical receiving elements 46b arranged in the X-axis direction, and the horizontal width (X-axis direction width) being WdT with Md rows arranged in the Y-axis direction. Furthermore, assuming each of the micromirrors 244a in the reflective mirror array 244 has an angle of deflection of ±αm in the vertical direction (the Y-axis direction) and an angle of deflection of ±βm in the horizontal direction (the X-axis direction), it is sufficient for a focal length f32 of the projection optical system 245 to fulfill the relationship indicated in the following Formulae (20) and (21).

$$f32 \times \sin \alpha m = WdL \times Nd/2 \quad (20)$$

$$f32 \times \sin \beta m = WdT \times Md/2 \quad (21)$$

In an optical system designed in this manner, when incident on an optical receiving element 46b in a jth position in the vertical direction (the Y-axis direction) and in a kth position in the horizontal direction (the X-axis direction) relative to the optical axis, it is sufficient to control tilts α and θ of the micromirrors 244a reflecting the fluorescence light wavelength thereof in the reflective mirror array 244 as indicated by the following Formulae (22) and (23).

$$\alpha = \sin^{-1}(j \times WdL/f32) \quad (22)$$

$$\beta = \sin^{-1}(k \times WdT/f32) \quad (23)$$

For example, as illustrated in FIG. 7(b), the reflected light LO1 of the point image IM11 condensed on an upper side of the reflective mirror array 244 in the Y-axis direction is condensed on the optical receiving elements 46b in an upper area on a left side in the X-axis direction and forms an image IM21, and reflected light LO2 of the point image IM12 condensed on a lower side of the reflective mirror array 244 in the Y-axis direction is condensed on the optical receiving elements 46b in a lower area on a right side in the X-axis direction and forms an image IM22.

Although it is desirable for the micromirrors 244a in the reflective mirror array 244 to be arranged two-dimensionally in the Y-axis direction, the micromirrors 244a may be arranged one-dimensionally instead. In this case, it is sufficient for control to be carried out so that the micromirrors 244a arranged in the X-axis direction and having the same height in the Y-axis direction have the same angle of reflection.

Configuring the spectroscope 240 according to the third embodiment as described above makes it possible to reduce the size of the elements in the reflective mirror array 244. Furthermore, in addition to selecting the detection regions 46a for the spectroscopic light reflected by the respective micromirrors 244a by rotating the micromirrors 244a in the reflective mirror array 244 in the direction orthogonal to the direction of spectral separation (the X-axis direction), configuring the micromirrors 244a to be rotatable in the direction of spectral separation (the Y-axis direction) also makes it possible to select the sub-regions 46a1 and 46a2 on the basis of the rotation angle of the micromirrors 244a in the Y-axis direction, without being fixed to positions in the optical receiving region of the optical receiver 46 corresponding to the direction of spectral separation determined by the wavelength of the signal light in the diffraction grating 42, or in other words, without being fixed to the sub-regions 46a1 and 46a2 in each detection region 46a.

Although each of the plurality of detection regions 46a is divided into sub-regions in the optical receiver 46 illustrated in FIG. 4, it is not necessary for all of the detection regions 46a to be divided into sub-regions, and it is sufficient for at least one of the detection regions 46a to be divided into sub-regions.

In addition, in the optical receiver 46 illustrated in FIG. 4, the detection regions 46a formed as rectangular regions that take the Y-axis direction as long sides and the X-axis direction as short sides are arranged in an array in the X-axis direction, or in other words, the rotation direction of the micromirrors 44a in the reflective mirror array 44, and each of the detection regions 46a is divided into a plurality of sub-regions (the two sub-regions 46a1 and 46a2, in FIG. 4) arranged in the Y-axis direction, or in other words, in the direction in which the signal light is spectrally separated by the diffraction grating 42 serving as a spectral element.

However, the configuration is not limited thereto. Two modifications on the optical receiver will be described hereinafter.

[First Modification]

Figure 9A:
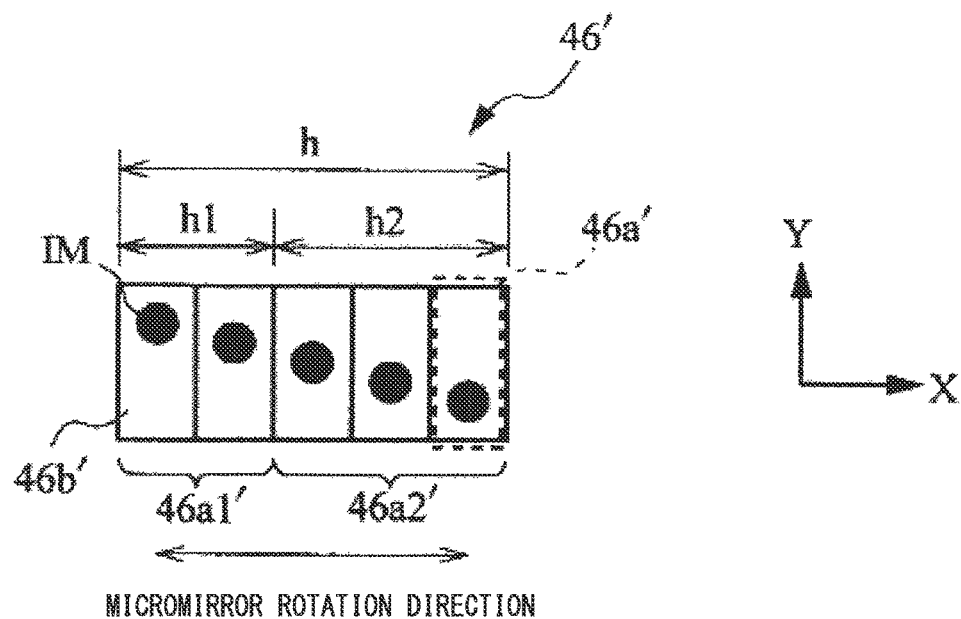
FIG. 9A is an explanatory diagram illustrating a first modification regarding a location of a detection region in an optical receiver.

In an optical receiver 46' according to a first modification and illustrated in FIG. 9(a), detection regions 46a' formed as rectangular regions that take the Y-axis direction as long sides and the X-axis direction as short sides are arranged in an array in the X-axis direction, or in other words, the rotation direction of the micromirrors 44a in the reflective mirror array 44. The optical receiver 46' has a first detection region group 46a1' constituted by two or more of the detection regions 46a' and a second detection region group 46a2' constituted by two or more of the detection regions 46a', and optical receiving elements 46b' disposed in the respective two region groups 46a1' and 46a2' are configured to have different photoelectric conversion sensitivities (conversion efficiencies) with respect to the wavelength of incident light in each of the region groups 46a1' and 46a2'. Although FIG. 9(a) illustrates a case where the two region groups 46a1' and 46a2' are disposed, the configuration may be such that three or more regions are disposed. In addition, the optical receiver 46' may, as illustrated in FIG. 9(a), be configured so that the optical receiving elements 46b' formed in rectangular shapes are disposed in close contact with adjacent optical receiving elements 46b' in the respective two region groups 46a1' and 46a2', or, like the optical receiver 46 illustrated in FIG. 4, may be configured with a plurality of circular or elliptical optical receiving elements arranged in the Y-axis direction in each of the detection regions 46a' and the sensitivities with respect to wavelength being varied from region group to region group.

Note that a configuration in which the optical receiver 46' illustrated in FIG. 9(a) can be used instead of the optical receiver 46 illustrated in FIG. 4 is a configuration having the condensing optical system 43, the reflective mirror array 44, and the projection optical system 45 illustrated in FIG. 2, FIG. 6, and FIG. 7. However, in the case where the rotation direction of the micromirrors 44a in the reflective mirror array 44 is the X-axis direction, a position where an image is formed on the optical receiver 46' in the Y-axis direction corresponds to a positional relationship with an image on the reflective mirror array 44, as with an image IM illustrated in FIG. 9(a), but can be set to be the same even in the case where the micromirrors 44a in the reflective mirror array 44 can also be rotated in the Y-axis direction.

[Second Modification]

Figure 9B:
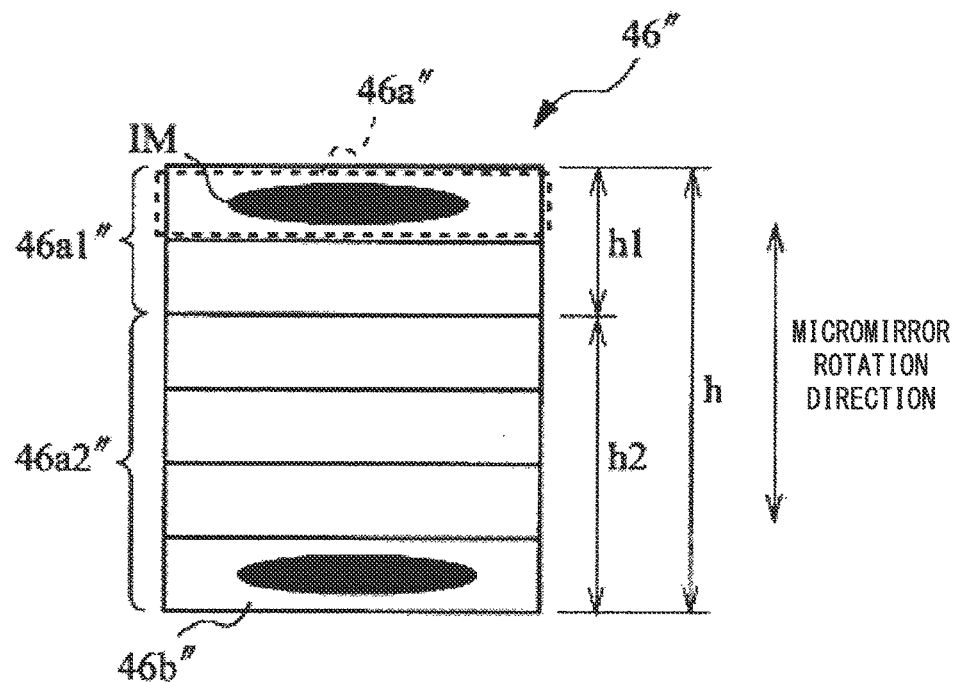
FIG. 9B is an explanatory diagram illustrating a second modification regarding a location of a detection region in an optical receiver.

In an optical receiver 46" according to a second modification and illustrated in FIG. 9(b), detection regions 46a" formed as rectangular regions that take the X-axis direction as long sides and the Y-axis direction as short sides are arranged in an array in the Y-axis direction. The optical receiver 46" has a first detection region group 46a1" constituted by two or more of the detection regions 46a" and a second detection region group 46a2" constituted by two or more of the detection regions 46a", and optical receiving elements 46b" disposed in the respective two region groups 46a1" and 46a2" are configured to have different photoelectric conversion sensitivities (conversion efficiencies) with respect to the wavelength of incident light in each of the region groups 46a1" and 46a2". Although FIG. 9(b) illustrates a case where the two region groups 46a1" and 46a2" are disposed, the configuration may be such that three or more regions are disposed. In addition, the optical receiver 46" may, as illustrated in FIG. 9(b), be configured so that optical receiving elements 46b" formed in rectangular shapes are disposed in close contact with adjacent optical receiving elements 46b" in the respective two region groups 46a1" and 46a2", or, like the optical receiver 46 illustrated in FIG. 4, may be configured with a plurality of circular or elliptical optical receiving elements arranged in the X-axis direction in each of the detection regions 46a' and the sensitivities with respect to wavelength being varied from region group to region group.

Note that a configuration in which the optical receiver 46" illustrated in FIG. 9(b) can be used instead of the optical receiver 46 illustrated in FIG. 4 is a configuration having the condensing optical system 43, the reflective mirror array 44, and the projection optical system 45 illustrated in FIG. 2, FIG. 6, and FIG. 7. However, it is necessary to set the rotation direction of the micromirrors 44a in the reflective mirror array 44 to the Y-axis direction instead of the X-axis direction, or to enable the micromirrors 44a in the reflective mirror array 44 to rotate in the Y-axis direction in addition to the X-axis direction. Furthermore, it is necessary to configure the second condensing lens 45b that constitutes the projection optical system 45 so that the refractive power in the X-axis direction is greater than the refractive power in the Y-axis direction, instead of the refractive power in the Y-axis direction being greater than the refractive power in the X-axis direction.

Setting the micromirrors 44a in the reflective mirror array 44 to rotate in the Y-axis direction makes it possible to rotate the spectrally-separated light in the Y-axis direction of the micromirrors 44a. Therefore, the region groups 46a1" and 46a2" can be selected by moving the image IM formed on the optical receiving region of the optical receiver 46' in the Y-axis direction.

Furthermore, as a fourth embodiment, a projection optical system constituted by the first condensing lens 45a having a rotationally symmetric refractive power with respect to the optical axis may be employed instead of the projection optical system 45 according to the first embodiment, which is constituted by the first condensing lens 45a having a rotationally symmetric refractive power with respect to the optical axis and the second condensing lens 45b whose refractive power in the Y-axis direction is greater than the refractive power in the X-axis direction. A line-shaped (in the Y-axis direction) image is formed on the optical receiver 46. In the case where the optical receiver 46 illustrated in FIG. 4 is applied, it is sufficient for the micromirrors 44a in the reflective mirror array 44 to be rotated in at least the X-axis direction. However, in the case where the optical receiver 46' illustrated in FIG. 7(a) is applied, it is preferable for the micromirrors 44a to rotate in both the X-axis direction and the Y-axis direction, whereas in the case where the optical receiver 46" illustrated in FIG. 7(b) is applied, it is sufficient for the micromirrors 44a to rotate in at least the Y-axis direction.

Further still, as a fifth embodiment, the reflective mirror arrays 44 and 244 and the projection optical systems 45 and 245 that are constituent elements of the spectroscopes 40, 140, and 240 according to the first to fourth embodiments (FIGS. 2, 6, and 7) may be omitted, and a spectroscope that directly detects spectroscopic light spectrally separated by the diffraction grating 42 using an optical receiver (PMT array), such as the optical receiver in the spectroscope disclosed in U.S. Pat. No. 7,286,225 (an optical receiver 237 of a spectral separation unit 230 as illustrated in FIG. 1, for example), the optical receiver in the spectroscope disclosed in U.S. Pat. No. 7,724,365 (a spectral detector 24 of a spectral detection unit 2 as illustrated in FIG. 1, for example), or the like may be employed instead of an optical receiver such as that illustrated in FIG. 9(b).

Note that it is possible to combine the conditions of each of the embodiments described above as appropriate. In addition, there may be cases where some constituent elements are not used. In addition, the disclosures of all of the published patents and US Patents relating to apparatuses or the like cited in each of the embodiments and modifications described above are incorporated as a part hereof by reference to the extent permitted by law.

What is claimed is:

1. A spectroscope comprising:
a spectral element that spectrally separates incident light;
a spatial light modulation element that has a plurality of reflective mirrors;
an optical receiver that has a plurality of photoelectric converting elements mounted on the optical receiver;
a first optical system that guides spectroscopic light spectrally separated by the spectral element to the spatial light modulation element; and
a second optical system that guides the light from the spatial light modulation element to the optical receiver;
wherein the first optical system and the second optical system have a greater refractive power in (1) a spectral separation direction in which the incident light is spectrally separated by the spectral element than in (2) a direction of arrangement of the photoelectric converting elements that is different from the spectral separation direction.

2. The spectroscope according to claim 1,
wherein the plurality of reflective mirrors are arranged at least in the spectral separation direction.

3. The spectroscope according to claim 1,
wherein the plurality of reflective mirrors are capable of rotating in the direction of arrangement of the photoelectric converting elements.

4. The spectroscope according to claim 1,
wherein the optical receiver is arranged at a rear-side focal position of the second optical system with respect to the direction of arrangement of the photoelectric converting elements.

5. The spectroscope according to claim 1,
wherein the spatial light modulation element and the optical receiver are in a conjugate relationship with respect to the spectral separation direction.

6. The spectroscope according to claim 1,
wherein the first optical system and the second optical system include a cylindrical lens.

7. The spectroscope according to claim 6,
wherein the second optical system includes a rotationally symmetric lens.

8. The spectroscope according to claim 1, comprising:
a collimating optical system that causes incident light to a substantially collimated light,
wherein the spectral element spectrally separates the substantially collimated light.

9. The spectroscope according to claim 1,
wherein the optical receiver includes a plurality of regions having different sensitivities with respect to a wavelength characteristics of the spectroscopic light.

10. A microscope system, comprising:
a microscope including objective lens, and
the spectroscope according to claim 1.

11. The microscope system according to claim 10,
wherein the microscope and the spectroscope are connected via an optical fiber.

* * * * *